United States Patent [19]
Klein

[11] 3,737,262
[45] June 5, 1973

[54] EXTRUSION APPARATUS

[75] Inventor: Norman E. Klein, Inman, S.C.

[73] Assignee: Deering Milliken Research Corporation, Spartanburg, S.C.

[22] Filed: Apr. 12, 1971

[21] Appl. No.: 133,218

[52] U.S. Cl. .................425/113, 425/190, 425/192, 264/176
[51] Int. Cl. ...........................B29c 27/30, B29f 1/10
[58] Field of Search.......................425/31, 113, 114, 425/190, 192; 264/172, 174, 40, 176, 177

[56] References Cited

UNITED STATES PATENTS

| | | | |
|---|---|---|---|
| 3,074,107 | 1/1963 | Mase et al. | 264/174 X |
| 3,415,919 | 12/1968 | Kippan | 425/114 X |
| 2,826,782 | 3/1958 | Dugall et al. | 425/190 |
| 2,904,846 | 9/1959 | Smith | 264/174 |
| 3,317,993 | 5/1967 | Brouse et al. | 425/113 X |
| 3,396,676 | 8/1968 | Hasten et al. | 425/190 |
| 3,474,495 | 10/1969 | Deutsch et al. | 425/113 |
| 3,611,492 | 10/1971 | Scherbling | 425/113 X |

*Primary Examiner*—Robert L. Spicer, Jr.
*Attorney*—Norman C. Armitage, H. William Petry and Arthur L. Urban

[57] ABSTRACT

Apparatus for extruding a unitary strip with a plurality of spaced cords including an extruder screw, a die operatively associated with the screw, the die including cord guiding means, strip sizing means comprising movable members, means for adjusting the position of the members with respect to each other to change the dimensions of the opening through the strip sizing means, and the cord guiding means and the strip sizing means defining a cavity for the flow of plastic material around spaced cords advancing through the die to deliver therefrom a unitary strip.

5 Claims, 10 Drawing Figures

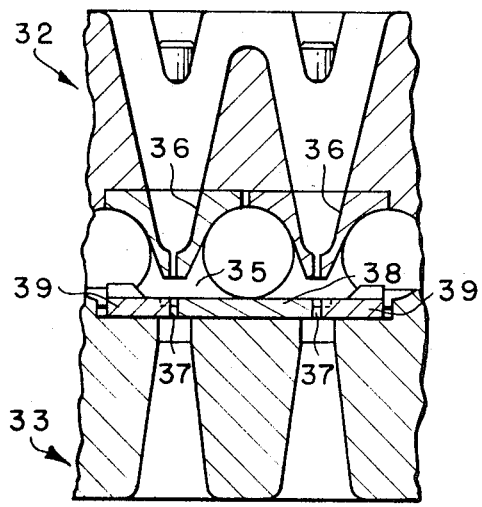
FIG.-6-
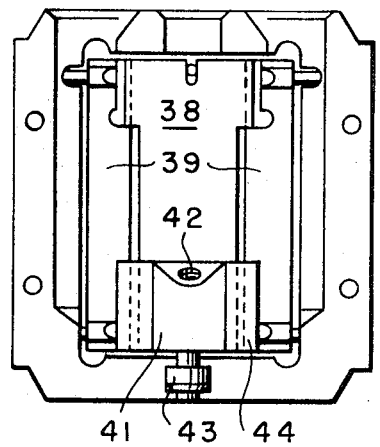
FIG.-7-
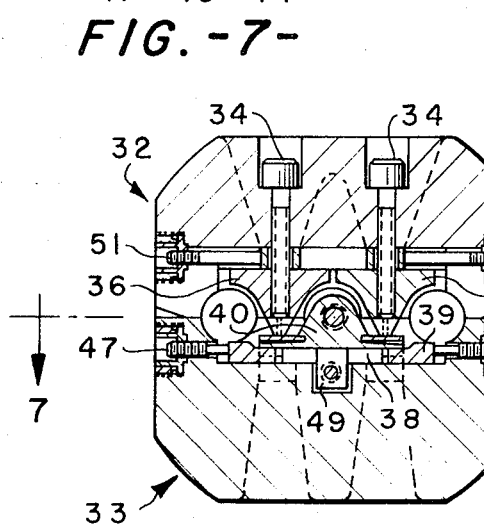
FIG.-5-
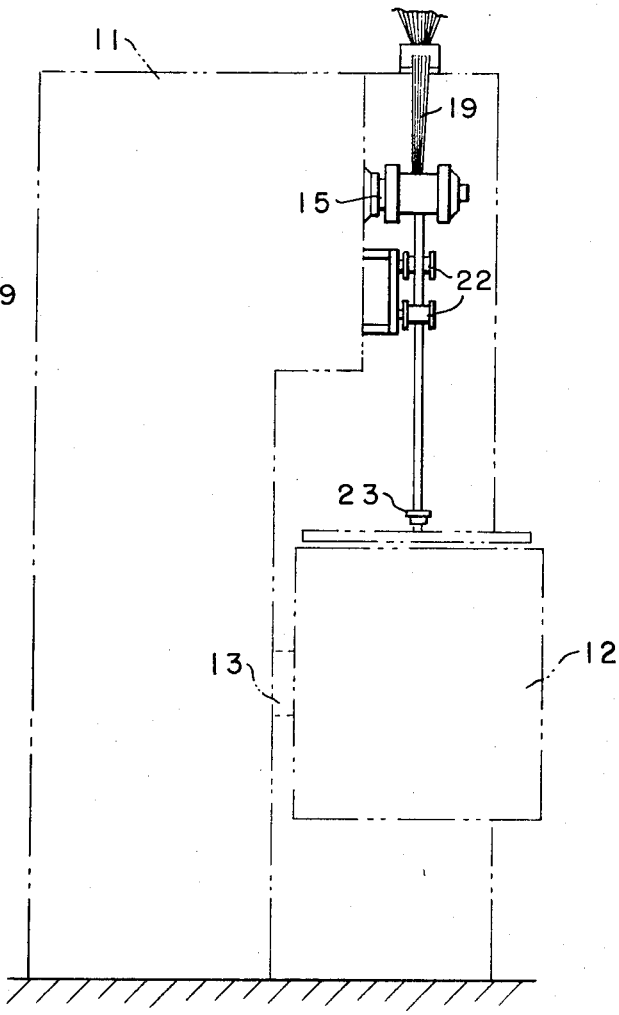
FIG.-1-
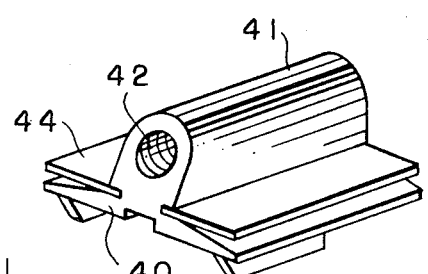
FIG.-8-
INVENTOR.
NORMAN E. KLEIN
BY
ATTORNEY

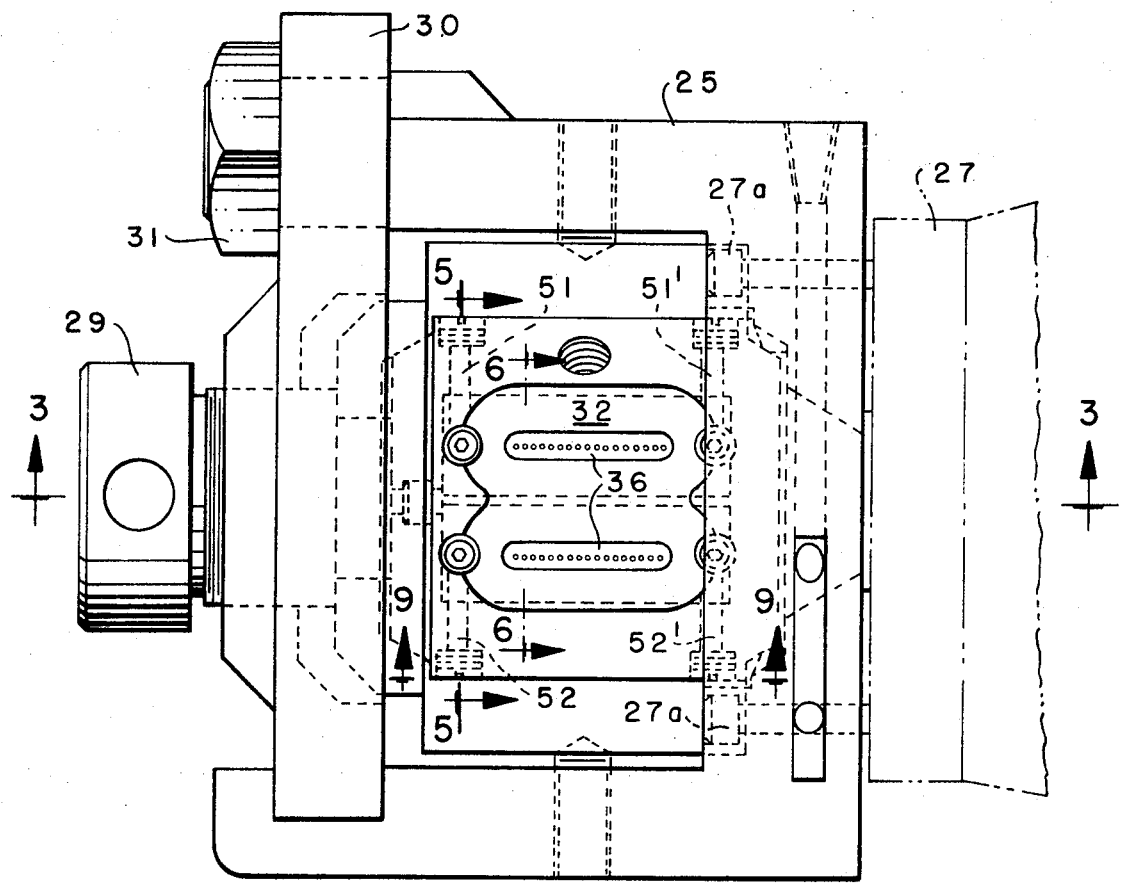
FIG.-2-
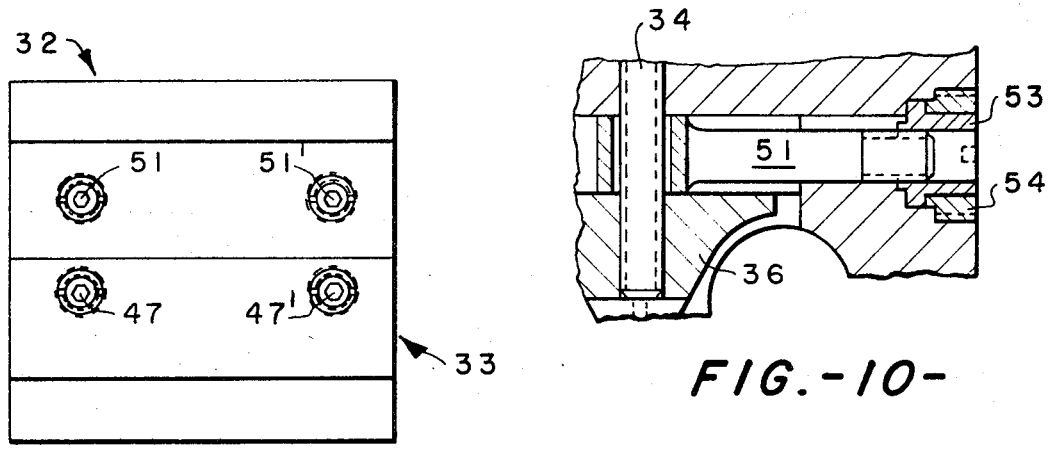
FIG.-9-
FIG.-10-
INVENTOR.
NORMAN E. KLEIN
BY Arthur L. Urban
ATTORNEY

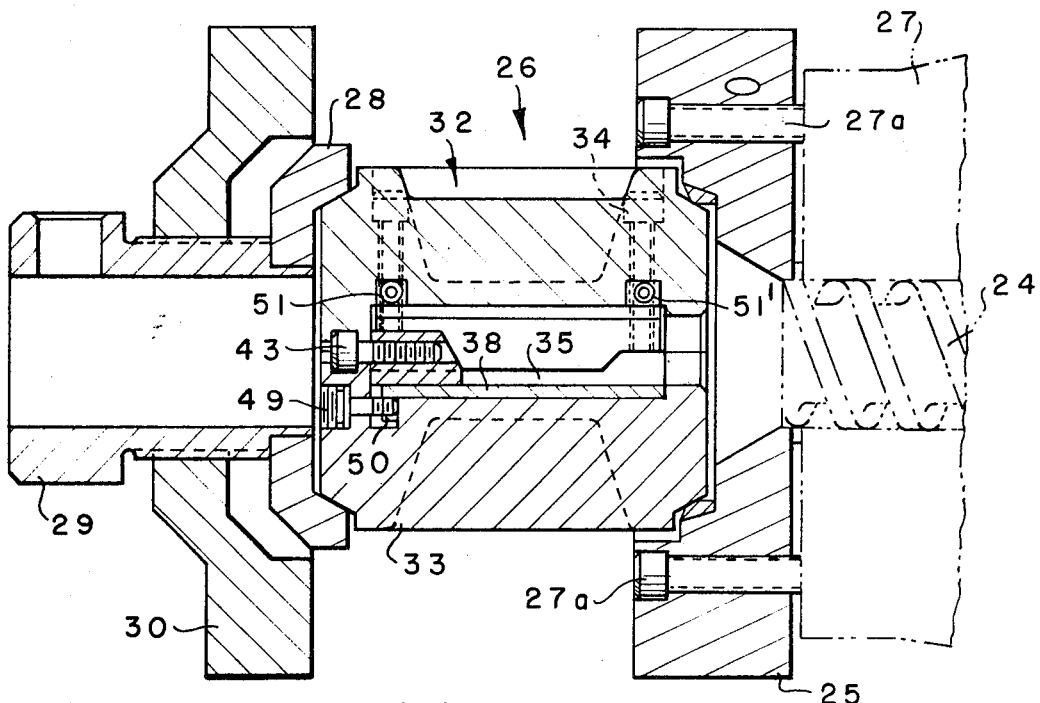
FIG.-3-
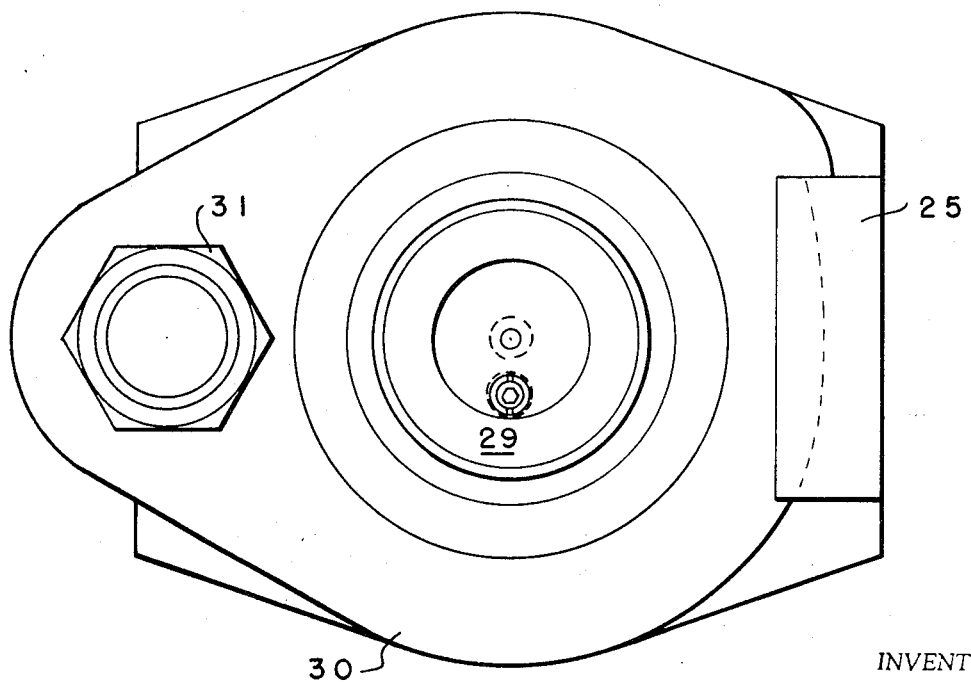
FIG.-4-
INVENTOR.
NORMAN E. KLEIN
BY
ATTORNEY

EXTRUSION APPARATUS

This invention relates to novel apparatus for extruding a unitary strip including a plurality of spaced cords and in addition relates to apparatus for simultaneously extruding more than one such unitary strip.

In the continuous extrusion of plastic materials such as rubber, etc., around one or more cords, wires is similar core materials, it is important that the extruder and die structure be adjustable to provide a uniform coating. If the coating is not of uniform thickness, problems arise in the assembly and fabrication of the coated cord into the final product. For example, in the formation of reinforcements for belted tires, rubber coated cords are employed to form the belt which is used under the tread of the tire. If the rubber coating on the cord is not uniform, contact between the cords may result during fabrication or use of the tire. This cord to cord contact is particularly detrimental when the cord material is easily abraded or degraded by rubbing contact such as fiber glass or metal wire. While there are difficulties in uniformly coating single cords, the problems increase greatly when it is desired to form unitary strips including a plurality of spaced cords.

The present invention provides novel apparatus for forming one or more unitary strips including a plurality of spaced cords. Furthermore, the invention provides new apparatus capable of forming strips of differing dimensions. Moreover, adjustment of the apparatus can be made simply and conveniently even while the extruder is operating. In addition the design of the apparatus facilitates rapid disassembly and reassembly for maintenance.

The invention will be described in detail with reference to the accompanying drawings in which:

FIG. 1 is a schematic illustration of one form of apparatus in accordance with the present invention;

FIG. 2 is a top view of the die portion of the apparatus shown in FIG. 1;

FIG. 3 is a sectional view taken along line 3—3 of FIG. 2;

FIG. 4 is a left end elevation of the apparatus shown in FIG. 2.

FIG. 5 is a sectional view taken along line 5—5 of FIG. 2;

FIG. 6 is an enlarged partial section taken along line 6—6 of FIG. 2;

FIG. 7 is a view taken along line 7—7 of FIG. 5;

FIG. 8 is an enlarged perspective view of a portion of the strip sizing assembly illustrated in FIG. 7.

FIG. 9 is a view taken along line 9—9 of FIG. 2; and

FIG. 10 is an enlarged fragmentary view of the means for aligning the cord openings of the guide assembly illustrated in FIG. 5.

As shown in FIG. 1, apparatus of the invention includes a supporting frame 11 in which a drive assembly (not shown) is located. A drum 12 is affixed to one end of a shaft 13 carried by the supporting frame. Strip-forming apparatus or die 15 is mounted on frame 11 above drum 12. Pull rolls 22 and traversing guide assembly 23 are positioned between die 15 and drum 12 for the transfer of unitary strips to the drum.

FIGS. 2-10 show the structure of die 15 in greater detail. The assembly includes a screw 24, a U-shaped frame member 25, and a clam shell die section 26 which is held in place therein by a recessed closure plate 28, closure bolt 29 and latch plate 30. Frame member 25 is attached to extruder barrel 27 by bolts 27a. One end of latch plate 30 is notched to rest on an extension of frame member 25 (FIG. 4) and the other end has an opening through which latch bolt 31 extends into threaded engagement with the other extension of frame 25.

The clam shell die section 26, as shown in FIG. 3, includes a cord guide assembly 32 and a strip sizing assembly 33 separable at section line 5—5 of FIG. 2 form a die cavity 35 therebetween. The cord guide assembly 32 has secured thereto by bolts 34 two guide members 36 each with a row of cord passages. Below the cord guide members are located strip slots 37 corresponding to the rows of cord openings in guide members 36.

Outlet slots 37 are formed from a central plate 38 and side plates 39 which are movable with respect to each other. A fourth plate 40 is positioned along plates 38 and 39 and in contact therewith. Plate 40 has an extension 41 with a threaded opening 42 for an adjustment screw 43 which is carried centrally between assemblies 32 and 33. Plate 40 also has spring strip wings 44 (FIG. 8) extending from notches at the base of extension 41. As shown in FIG. 5, the wings 44 bear against the lower surface of guide members 36 to seal the unused cord openings therein. In operation, rubber flows between the plate 40 and the wings 44 and presses against the wings to tightly seal the wings against the openings and thereby prevent the leaking of rubber from the die cavity. Pairs of jack screws 47, 47' and 48, 48' attached to plates 39 control the width of the slots 37. Central plate 38 is movable through screw 49 which is threaded into the end tab 50 thereof (FIG. 3). Adjustment of captive nuts 53 which engage screws 43, 47, 47' and 48, 48' together with screw 49 provides bi-directional control of the cross-sectional dimensions of the respective strips. Since screws 47, 47' and 48, 48' are employed in pairs at the forward and rear ends of plates 39, it is possible to cant the position of the plates. Such an adjustment is useful to provide a uniform thickness to the strips since the end of the slot opening close to the extruder screw is under a significantly higher pressure than that of the other end. In like manner, eye-screws 51, 51' and 52, 52' engage additional captive nuts 53. FIG. 10 shows an adjustment screw 51 which engages nut 53 at one end and at the opposite end engages bolt 34 which is affixed to guide member 36. Longitudinal movement of adjustment screw 51 moves guide member 36 and thus changes the alignment of cord openings therein. Nuts 53 are maintained in a captive position by retention rings 54.

In the operation of the apparatus of the invention shown in the drawings, a plurality of cords 19 from a creel (not shown) are drawn through die 15. The cords pass through openings in guide members 36 into die cavity 35 containing rubber under pressure which has been delivered by extruder screw 24. Two unitary strips including a plurality of cords embedded in rubber are withdrawn through slots 37 and around pull rolls 22 to traversing guide assembly 23 which deposits these strips on the surface of rotating drum 12. The strips are deposited in a zigzag pattern as the guide assembly is reciprocated transversely of the drum rotation. Deposition of the strips and rotation of the drum is continued until a complete belt suitable for use as a tread reinforcement in a belted tire is produced.

The above description and drawings show that the present invention provides novel apparatus for forming one or more unitary strips each including a plurality of spaced cords. Moreover, the apparatus is capable of forming strips of differing dimensions and permits the adjustment of the dimensions simply and conveniently even while the extruder is in operation. Furthermore, the clam shell design of the die permits rapid disassembly and reassembly for maintenance or cleaning. Also the apparatus provides for a simple adjustment to insure centering of the cords within the unitary strip being formed.

It will be apparent from the description and drawings that various modifications may be made in the specific designs and procedures described above within the scope of the invention. For example, the arrangement of the cord passages in the cord guide member may be of a configuration other than a straight line. Also, the means for adjusting the strip sizing plates may be different. Therefore, the description and drawings are intended to illustrate specific embodiments of the invention, and the scope of the invention is to be limited only by the following claims:

That which is claimed is:

1. Apparatus for extruding a unitary strip with a plurality of spaced cords including an extruder screw, a die operatively associated with said screw separable into a portion including cord guiding means and a portion including strip sizing means, said cord guiding means having a plurality of spaced openings disposed in a single plane, said strip sizing means including movable members disposed in a single plane defining the thickness of said strip and a movable member disposed adjacent to said other members defining the width of said strip, means for adjusting the position of said movable members with respect to each other to change the dimensions of the opening through said strip sizing means, and said cord guiding means and said strip sizing means defining a cavity for the flow of plastic material around spaced cords advancing through said die to deliver therefrom a unitary strip.

2. Apparatus according to claim 1 wherein a plurality of cord guiding means and a plurality of strip sizing means are included in said die.

3. Apparatus according to claim 1 wherein said separable portions are held together by external clamping means to facilitate coupling of said die with said extruder screw.

4. Apparatus according to claim 1 wherein said strip sizing means includes means for simultaneously closing unused portions of said cord guiding means as the width of said strip is reduced.

5. Apparatus according to claim 1 wherein said cord guiding means includes means for adjusting the position thereof relative to said strip sizing means.

* * * * *